US009225743B1

(12) United States Patent
Naik (10) Patent No.: US 9,225,743 B1
(45) Date of Patent: Dec. 29, 2015

(54) AUTOMATIC GENERATION OF POLICY FROM A GROUP OF SSL SERVER CERTIFICATES

(75) Inventor: Alok Naik, Bangalore (IN)

(73) Assignee: Symantec Corporation, Mountain View, CA (US)

( * ) Notice: Subject to any disclaimer, the term of this patent is extended or adjusted under 35 U.S.C. 154(b) by 217 days.

(21) Appl. No.: 13/445,159

(22) Filed: Apr. 12, 2012

(51) Int. Cl.
| G06F 17/30 | (2006.01) |
| H04L 29/06 | (2006.01) |
| G06F 21/31 | (2013.01) |
| G06F 21/36 | (2013.01) |
| H04L 9/32 | (2006.01) |

(52) U.S. Cl.
CPC ............. *H04L 63/20* (2013.01); *G06F 21/31* (2013.01); *G06F 21/36* (2013.01); *H04L 9/3263* (2013.01); *H04L 9/3268* (2013.01); *H04L 63/102* (2013.01)

(58) Field of Classification Search
CPC . H04L 63/0823; H04L 9/3263; H04L 9/3268; H04L 63/20; H04L 63/102; G06F 21/31; G06F 21/36
See application file for complete search history.

(56) References Cited

U.S. PATENT DOCUMENTS

| 6,671,804 B1* | 12/2003 | Kent ........................... 713/175 |
| 2006/0156391 A1* | 7/2006 | Salowey ........................... 726/5 |
| 2011/0078448 A1* | 3/2011 | Chow et al. ................... 713/175 |
| 2011/0231662 A1* | 9/2011 | Sato et al. ..................... 713/176 |
| 2012/0117608 A1* | 5/2012 | Metke et al. ...................... 726/1 |

OTHER PUBLICATIONS

Symantec Corporation. (Jan. 2011), "Symantec Certificate Intelligence Center, Simplify SSL Certificate Discovery and Management Across the Enterprise," 3 pages.

* cited by examiner

*Primary Examiner* — Ali Abyaneh
*Assistant Examiner* — Carlton Johnson
(74) *Attorney, Agent, or Firm* — Lowenstein Sandler, LLP (57) ABSTRACT

A method and apparatus for automatically generating policies from a set of cryptographic certificates is described. An automated policy generator, executing on a computing system, receives information from a set of one or more cryptographic certificates deployed in a network. The automated policy generator automatically generates a policy from the information of the set of cryptographic certificates.

19 Claims, 5 Drawing Sheets

AUTOMATIC GENERATION OF POLICY FROM A GROUP OF SSL SERVER CERTIFICATES

TECHNICAL FIELD

Embodiments of the invention relate to the field of processing data, and more particularly, to automatic generation of policies from a group of SSL server certificates.

BACKGROUND OF THE INVENTION

For today's enterprise, Secure Socket Layer (SSL) security is important, but is becoming more difficult to manage. With network infrastructure that spans multiple groups of servers, organization units, and locations, managing SSL certificates can be a complex, time-consuming process that burdens information technology (IT) teams and puts a drain on resources.

SSL certificates within the enterprise are frequently at odds with official policies and procedures put in place to administer SSL security. In some cases, older SSL certificates may conflict with new policies, or customized exceptions are made to meet unique business requirements. In addition, employees and business unit representatives may lack the knowledge to be aided by policies created by their companies. All of these factors create variance across the enterprise, complicating the overall management of SSL security.

Regardless of the cause, any uncertainty surrounding SSL certificates status poses a risk that can have serious consequences. The expiration of an unknown certificate, a missed renewal, or update—or keeping expired certificates on an asset—can create security vulnerabilities, leaving enterprise networks exposed and potentially resulting in critical system downtime. If a data breach occurs, the costs of mitigating the damage can be expensive: enterprises can face higher support costs, lower productivity and revenue, and even damage to their hard-earned reputations.

SUMMARY OF THE INVENTION

A method and apparatus for automatically generating policies from a set of cryptographic certificates is described. An automated policy generator, executing on a computing system, receives information from a set of one or more cryptographic certificates deployed in a network. The automated policy generator automatically generates a policy from the information of the set of cryptographic certificates. In one embodiment, the set of cryptographic certificates includes at least one of Secure Sockets Layer (SSL) server certificates or Transport Layer Security (TLS) server certificates. Alternatively, other cryptographic certificates can be used. In one embodiment, the information is stored in a data repository, such as a centralized repository for the network (e.g., enterprise's network).

In one embodiment of a method, processing logic (e.g., hardware, software, firmware, or any combination thereof) identifies a violation of the automatically generated policy by other cryptographic certificates deployed in the network. In another embodiment, the processing logic identifies a violation of the automatically generated policy by other cryptographic certificates deploying in another network. In one embodiment, the information includes certificate parameters, such as expiration information, a signature algorithm information, key length information, and certificate issuer information. In one embodiment, the processing logic automatically generates the policy by defining a set of conditions based on the certificate parameters. When the set of conditions are met by a deployed cryptographic certificate, the deployed cryptographic certificate violates the automatically generated policy.

In one embodiment, the set of cryptographic certificates includes valid and invalid certificates. Thus, the information may include certificate parameters from valid cryptographic certificates, certificate parameters from invalid cryptographic certificates, or any combination thereof.

In another embodiment of the method, the processing logic applies the automatically generated policy to a set of certificates discovered in the network, and generates a list of violating certificates. In a further embodiment, the processing logic notifies an administrator of the network of the list of violating certificates. In another embodiment, the processing logic initiates a remedial action for the list of violating certificates.

In another embodiment of the method, the processing logic receives first input to designate a first subset of the set of cryptographic certificates as valid certificates, and receives second input to designate a second subset of the set of cryptographic certificates as invalid certificates. In this embodiment, the processing logic automatically generates the policy by evaluating certificate parameters of the cryptographic certificates from the first and second subsets, and defines a set of conditions of the policy based on said evaluating. In one embodiment, the processing logic evaluates by comparing expiration parameters of the valid certificates and invalid certificates, and defines an expiration condition of the policy based on the expiration parameters of the valid certificates and invalid certificates. In another embodiment, the processing logic evaluates by comparing key length parameters of the valid certificates and invalid certificates, and defines a key length condition of the policy based on the key length parameters of the valid certificates and invalid certificates. In other embodiments, the processing logic can evaluate other certificate parameters of the valid and invalid certificates and can define other conditions based on the evaluations.

In addition, a computer readable storage medium for automatically generating a policy from information of a set of cryptographic certificates is described. An exemplary computer readable storage medium provides instructions, which when executed on a processing system causes the processing system to perform a method such as the exemplary methods discussed above.

Further, systems and apparatus of an automated policy generator are described. An exemplary apparatus may include a memory and a processor coupled to the memory. The processor is configured to execute the automated policy generator to perform various operations, such as those described above.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION OF THE PRESENT INVENTION

A method and apparatus for automatically generating policies from a set of cryptographic certificates is described. An automated policy generator, executing on a computing system, receives information from a set of one or more cryptographic certificates deployed in a network. The automated policy generator automatically generates a policy from the information of the set of cryptographic certificates. In the following description, numerous details are set forth. It will be apparent, however, to one of ordinary skill in the art having the benefit of this disclosure, that embodiments of the present invention may be practiced without these specific details.

Figure 1:
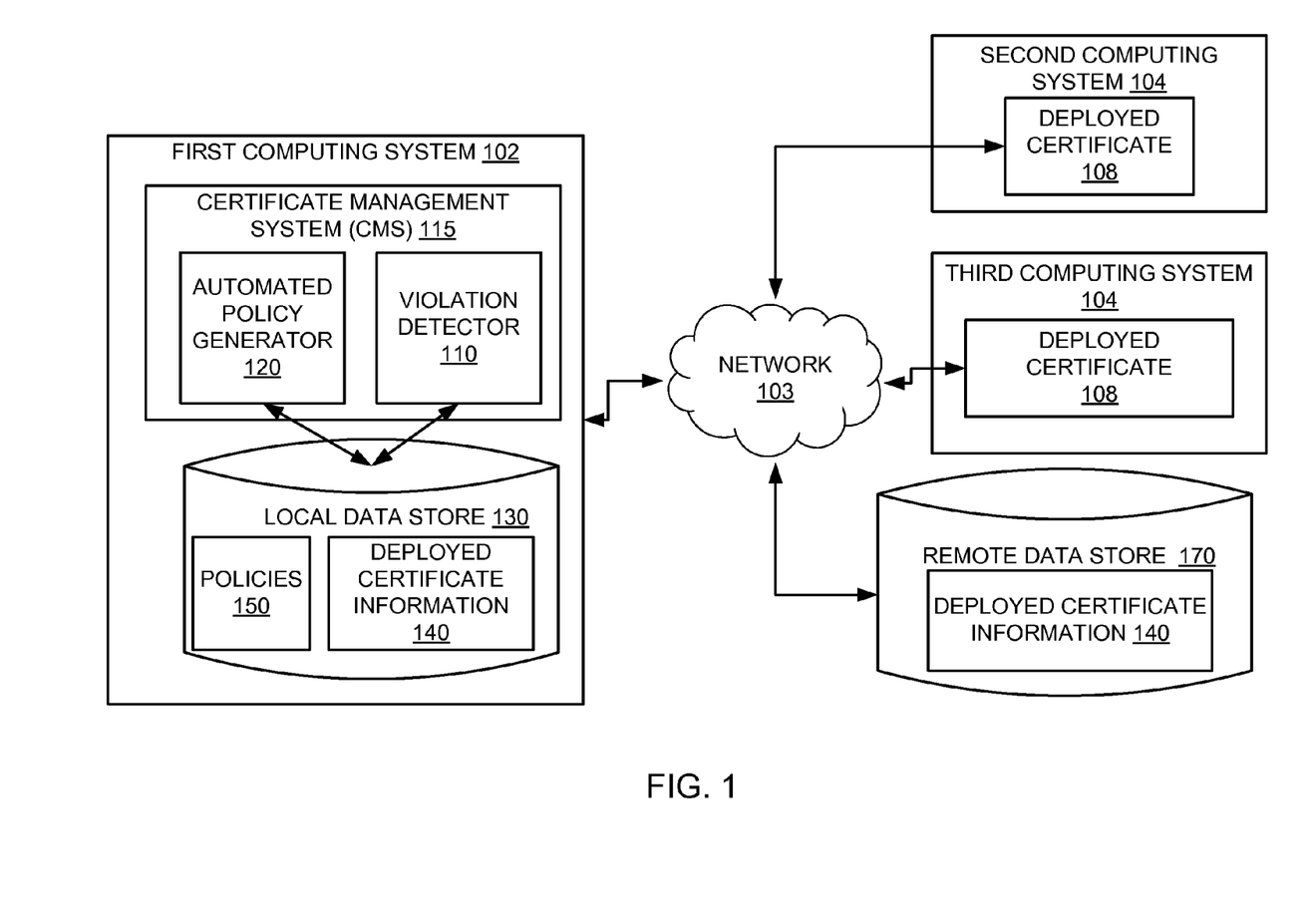
FIG. 1 is a block diagram of exemplary network architecture in which embodiments of an automated policy generator may operate.

FIG. 1 is a block diagram of an exemplary network architecture 100 in which embodiments of an automated policy generator 120 may operate. The network architecture 100 may include multiple computing systems 102, 104 coupled via a network 103 (e.g., public network such as the Internet or private network such as a local area network (LAN)). The computing systems 102, 104 may include personal computers, laptops, personal digital assistants (PDAs), mobile phones, network appliances, a gateway, server computer, etc. The computing systems 102, 104 may reside on the same LAN, or on different LANs that may be coupled via the Internet, but separated by firewalls, routers, and/or other network devices. In another embodiment, the computing systems 102, 104 may reside on different networks.

In the depicted embodiment, the first computing system 102 hosts the automated policy generator 120 and a violation detector 110, as describe below. The second and third computing systems 104 can be configured for various purposes. The second and third computing systems 104 store one or more deployed certificates 108. The deployed certificates 108 may be SSL sever certificates, TLS server certificates, or other types of cryptographic certificates. Although the depicted embodiment illustrates two computing systems, the deployed certificates 108 may be deployed in more than two computing systems. For example, the deployed certificates 108 may be deployed in hundreds and even thousands of computing systems in a network. Although the depicted embodiment illustrates the automated policy generator 120 as residing on a single machine with the violation detector 110; alternatively, the functionality of the automated policy generator 120 and the violation detector 110 can be distributed over the two or more machines. Alternatively, other configurations are possible. In one embodiment, the computing systems 102 is used by an administrator of an enterprise, such as an organization, a company, a university, or the like, and the second and third computing systems 104 may be machines implemented in a network of the enterprise.

In one embodiment, the automated policy generator 120 is implemented as part of a certificate management system (CMS) 115 that can provide a view of SSL security across the enterprise, allowing administrators to take control of all SSL certificates issued by any Certificate Authority. In one embodiment, the CMS 115 can scan and centralize information about the SSL certificates into a central repository. The CMS 115 may give administrators detailed intelligence they need to manage the enterprise SSL environment quickly and easily. For example, an enterprise with more than 100 servers under management can use the CMS 115 to automate discovery tasks and set up alerts to notify administrators when certificates expire or require maintenance. With the CMS 115, automated and configurable discovery scans can be performed to reduce the time taken to keep track of SSL certificate assets.

The CMS 115 may include a console and multiple sensors. The sensors may be installed at strategic points in the network and perform actions based on instructions assigned by an administrator using the console. Together, these tools can provide a mechanism to audit and manage the SSL certificates across the network. The CMS 115 may include customizable SSL certificate discovery feature that can be used to schedule and configure how scans are performed across different parts of the network, while taking advantage of sensors that can scale to thousands of servers.

The CMS 115 may include a rich, intuitive user interface, such as with a dashboard for easy-to-use reporting capabilities and providing access to certificate information. The CMS 115 may use analytical tools to act on discovered data to provide information such as Online Certificate Status Protocol (OCSP) responses, Certificate Revocation List (CRL) responses, forecasting calculations, ratings, or the like. The CMS 115 may also include in-console alerts and email notifications to inform users of pending certificate expiration and other certificate lifecycle status to provide relevant and timely information to administrators. The CMS 115 may also be used to delegate task to appropriate individuals to handle the tasks. The CMS 115 may have customizable user management and role-based access, such as using pre-determined roles. The CMS 115 can also be used for audit trails by creating logs that record actions taken by administrators, logs that record key events associated with the sensors, or the like.

In another embodiment, the automated policy generator 120 is part of another system than the CMS 115. In another embodiment, the CMS 115 includes the automated policy generator 120, but not the violation detector 110. In another embodiment, the CMS 115 includes the violation detector 110, and the automated policy generator 120 is implemented in another system. In one embodiment, the CMS 115 is used to collect information about the deployed certificates 140 and stores the deployed certificate information 140 in a local data store 130. In the depicted embodiment, the local data store 130 is local to the computing system 102. In another embodiment, the deployed certificate information 140 can be stored in a remote data store 170. The local data store 130 and the remote data store 170 may be data stores of one or more data repositories that represent a single or multiple data structures (databases, repositories, files, etc.) residing on one or more mass storage devices, such as magnetic or optical storage based disks, tapes or hard drives. Although illustrated as being local to the computing system 102, the local data store 130 may be remote from the computing system 102 and the computing system 102 can communicate with the local data store 130 over a public or private network, which may be the same network 103 or a different network. In the case of being the same network 103, this is illustrated in FIG. 1 as the remote data store 170 that stores the deployed certificate information 140. It should be noted that the computing system 102 may have both the local and remote data stores or may have one or the other.

In one embodiment, the automated policy generator 120 is configured to receive information from a set of one or more cryptographic certificates 108 deployed in the network. The automated policy generator 120 automatically generates a policy from the information of the set of cryptographic certificates. In one embodiment, the automated policy generator 120 queries the deployed certificate information 140 from the local data store 130, from the remote data store 170, or both. The automated policy generator 120 evaluates the information 140, and defines conditions for the policy based on the evaluations. The deployed certificate information 140 may include certificate information about the deployed certificates 108, such as expiration information, key length, or the like. The set of deployed certificates 108 may include valid certificates and invalid certificates. The certificate parameters of the valid and invalid certificates can be used evaluated by the automated policy generator 120 to define the conditions for the policy.

In one embodiment, the violation detector 110 is configured to detect violations of the policy, automatically generated by the automated policy generator 120. In one embodiment, the violation detector 110 identifies a violation of the automatically generated policy by other cryptographic certificates deployed in the network 103. In another embodiment, the violation detector 110 identifies a violation of the automatically generated policy by other cryptographic certificates deployed in another network. It should also be noted that the set of information of the deployed certificates may include certificates that are currently deployed in the network 103. In another embodiment, an administrator can designate valid certificates, invalid certificates, or any combination thereof to be included in the set of deployed certificates from which the policy is generated. For example, in one embodiment, the automated policy generator 120 receives first input to designate a first subset of the set of cryptographic certificates as valid certificates, and second input to designate a second subset of the set of cryptographic certificates as invalid certificates.

The automated policy generator 120 can automatically generate the policy by evaluating certificate parameters of the cryptographic certificates from the first and second subsets and defining a set of conditions of the policy based on the evaluations. For example, a subset of valid certificates may include a key length greater than 128 bits, and a subset of invalid certificates may include a key length greater than 128 bits. The automated policy generator 120 can define a condition for the policy to indicate that the deployed certificate needs to have a key length of 128 bits or greater in order to not violate the policy. Using the automatically generated policy, the violation detector 110 can detect violations of the policy by other deployed certificates 108 deployed in the network 103 (or another network).

As described above, the CMS 115 can be used to collect and maintain the deployed certificate information 140, and the automated policy generator 120 can automatically generate one or more policies for deployed certificates using the deployed certificate information 140. In another embodiment, the CMS 115 receives input from an administrator to designate specific certificates, such as a sampling of valid and invalid certificates, from which to automatically generate the policy.

Although only one computing system 104 is illustrated in FIG. 1, the CMS 115 may be hosted on one or more machines, including one or more server computers, client computers, gateways or other computing devices. In yet another configuration, the social networking service may reside on a single server or on different servers, coupled to other devices via a public network (e.g., the Internet) or a private network (e.g., LAN). In one embodiment, the CMS 115 is part of an organization's system referred to herein as an enterprise. In another embodiment, a service provider hosts the CMS 115. The hosted service provider may also have multiple instances of the CMS 115 on multiple networks that communicate with the service provider over a public or private network. It should be noted that various other network configurations can be used including, for example, hosted configurations, distributed configurations, centralized configurations, etc. The same may be true for the computing system 104 that host the CMS 115.

Figure 2:
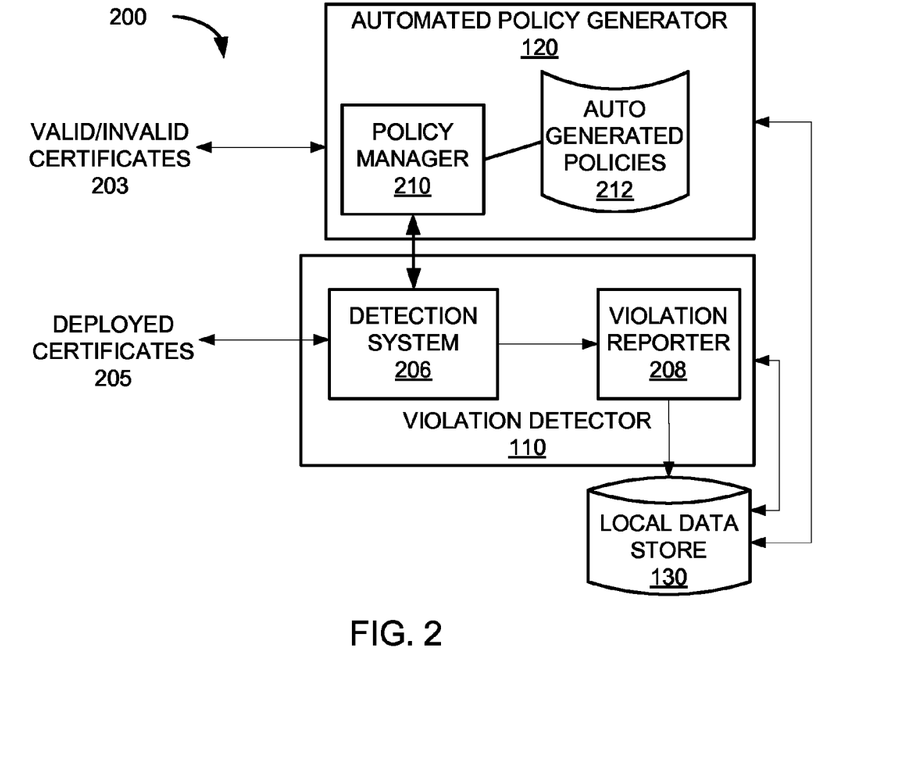
FIG. 2 is a block diagram of one embodiment of a content management system, including an automated policy generator and a violation detector.

FIG. 2 is a block diagram of one embodiment of a content management system 200, including the automated policy generator 120 and the violation detector 110 of FIG. 1. In the depicted embodiment, the automated policy generator 120 includes a policy manager 210 that is used to create and manage the automatically generated policies 212. The policy manager 210 receives input, such as configuration input, that designates certificates as the set to be used to automatically generate the certificates 212. In another embodiment, the policy manager 210 can receive input from another system to designate a set of certificates 203 that can be used for automated policy generation. In one embodiment, the policy manager 210 receives a set 203 of any combination of valid and invalid certificates from an administrator. In another embodiment, the policy manager 210 receives information from the administrator that designates which information stored in the local data store 130 (or remote data store 170) corresponds to the set of deployed certificates to be used for automated policy generation. Using the deployed certificate information, such as the set 203, the policy manager 210 evaluates the information, such as the certificate parameters of the set 203, and defines one or more conditions for one or more of the automatically generated policies 212 based on the evaluation of the information.

In the depicted embodiment, the violation detector 110 includes a detection system 206 and a violation reporter 208. In one embodiment, the detection system 206 is configured to monitor deployed certificates 205. The deployed certificates 205 can be discovered and the information stored in the local data store 130 (or remote data store 170), and the detection system 206 can periodically scan the information in the local data store 130 (or 170), such as in response to a scheduled task or in response to an administrator's input. The deployed certificates 205 can also be individually checked by the detection system 206. For example, the detection system 206 can request a deployed certificate and evaluate the deployed certificate without storing information in the local data store 130 (or 170).

The detection system 206 is configured to determine whether the deployed certificates 205 violate one or more of the automatically generated policies 212. In one embodiment, the detection system 206 compares the deployed certificates 205 against one or more of the automatically generated policies 212. For example, the detection system 206 can retrieve the policies 212 via the policy manager 210. Alternatively, the policies 212 may be stored in the local data store 130 (or 170) and can be accessed by the detection system 206 without the use of the policy manager 210. In response to a violation, the violation detector 110 can perform some remedial or notification operation to help enforce the automatically generated policies 212. In one embodiment, the detection system 206 notifies the violation reporter 208 that a violation has been detected, and the violation reporter 208 notifies an administrator or creates a list of violations for remedial or notification purposes. In some embodiments, the detection system 206 can alert a user or an administrator upon determining the violation. Alternatively, the detection system 206 can alert the user and the administrator. The alert may contain information about the violation, such as the location of the deployed certificate, the condition violated, or the like.

In another embodiment, the violation reporter 208 creates an incident record of the violation, sends the incident record to another system, and stores the incident record in the local data store 130 or 170, or both. The violation reporter 208 can send the incident records as they are generated or periodically. Similarly, the violation reporter 208 can send multiple incident records to another system in batches or sequentially. If a violation is detected, the violation reporter 208 may notify a system administrator (e.g., send an email or update a log file) about the policy violation incident, and may send information about the policy violation incident to another database or data repository for tracking violations. In another embodiment, the violation reporter 208 notifies a service provider of the violation and sends information about the violation to the service provider, such as information that identifies the policy being violation, the condition(s) violated, the location of the deployed certificate or other information concerning the violation. For example, the deployed certificate information may be stored according to an identifier, and the violation reporter 208 can send some or all of the information stored in the data store 130 associated with the identifier to the service provider. Alternatively, the violation reporter 208 may send other information that may be helpful in notifying or remedying the violation incidents, or possibly preventing future violation incidents.

In another embodiment, the violation reporter 208 can track the violations and generate a list of deployed certificates that violate one or more conditions. The list may identify which certificates violate the policy, what policy is violated, what condition(s) within the policy are violated, or the like. The list may be used by an administrator to initiate remedial actions or notification actions for the deployed certificate that violate one or more of the automatically generated policies 212.

It should be noted that the CMS 200 may include other components for monitoring deployed certificates and automatically generating policies for detecting violations of the policy by deployed certificates in a network. Details regarding these other components have not been included to not obscure the description of the present embodiments. Further operations of the automated policy generator 120 and the violation detector 110 are described below with respect to FIGS. 3A-3B.

Figure 3A:
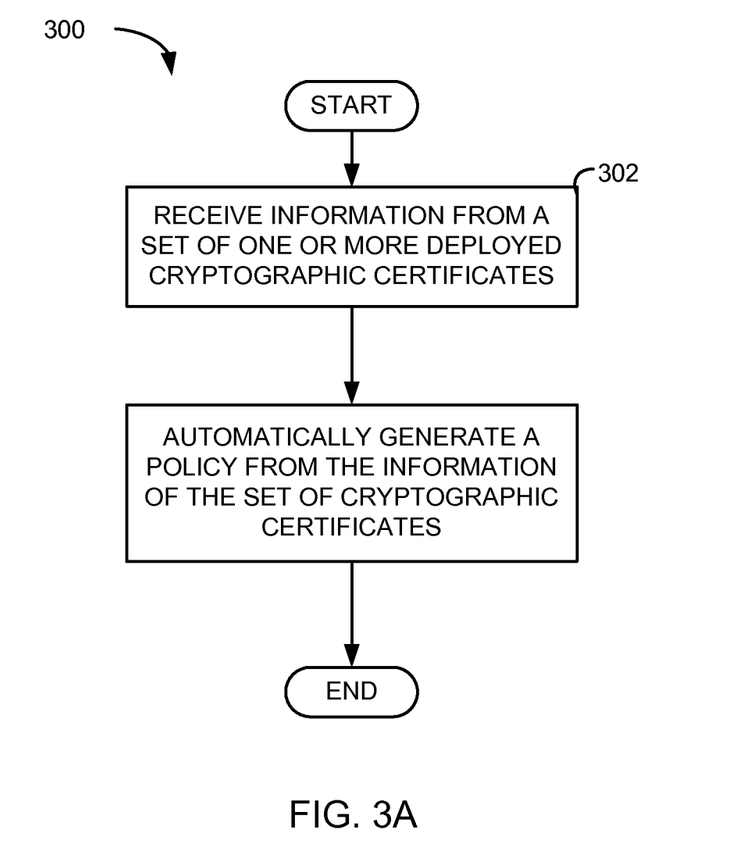
FIG. 3A is a flow diagram of one embodiment of a method of automatically generating a policy from information of a set of one or more cryptographic certificates deployed in a network.

FIG. 3A is a flow diagram of one embodiment of a method 300 of automatically generating a policy from information of a set of one or more cryptographic certificates deployed in a network. The method 300 is performed by processing logic that may comprise hardware (circuitry, dedicated logic, etc.), software (such as is run on a general-purpose computing system or a dedicated machine), or a combination of both. In one embodiment, the computing system 102 of FIG. 1 performs the method 300. In another embodiment, the automated policy generator 120 of FIGS. 1 and 2 performs the method 300. In another embodiment, the CMS 115 of FIG. 1 or CMS 200 of FIG. 2 performs the method 300. Alternatively, other components of the computing system 102, computing system 104, or of both can be configured to perform some or all of the method 300.

Referring to FIG. 3A, processing logic begins method 300 by receiving information from a set of one or more cryptographic certificates deployed in a network (block 302). The processing logic automatically generates a policy from the information of the set of cryptographic certificates (block 304), and the method 300 ends. The set of cryptographic certificates may include SSL server certificates, TLS server certificates, or any combination of cryptographic certificates deployed in the network (or in another network). In a further embodiment, the processing logic obtains the information from deployed certificate information stored in a data repository. The deployed certificate information may include certificate parameters associated with the deployed certificates, such as number of days till expiry, signature algorithms, key lengths, certificate issuers, or the like.

In another embodiment, the processing logic automatically generates the policy by defining a set of conditions based on the certificate parameters, which when met by a cryptographic certificate, violates the automatically generated policy. In one embodiment, the certificate parameters include one or more of expiration information, a signature algorithm information, key length information, or certificate issuer information of the set of deployed certificates. In another embodiment, other types of certificate parameters can be used for automatically generating one or more policies for other deployed certificates deployed in the same network or in another network. In one embodiment, the processing logic receives input to designate the set of certificates as having valid certificates, invalid certificates, or any combination thereof. The information stored in the data repository may include at least one of certificate parameters of valid cryptographic certificates or certificate parameters of invalid cryptographic certificates.

In another embodiment, the processing logic receives first input to designate a first subset of the set of cryptographic certificates as valid certificates and receives second input to designate a second subset of the set of cryptographic certificates as invalid certificates. The processing logic can automatically generate the policy by evaluating certificate parameters of the cryptographic certificates from the first and second subsets, and defining a set of conditions of the policy based on the evaluations.

Figure 3B:
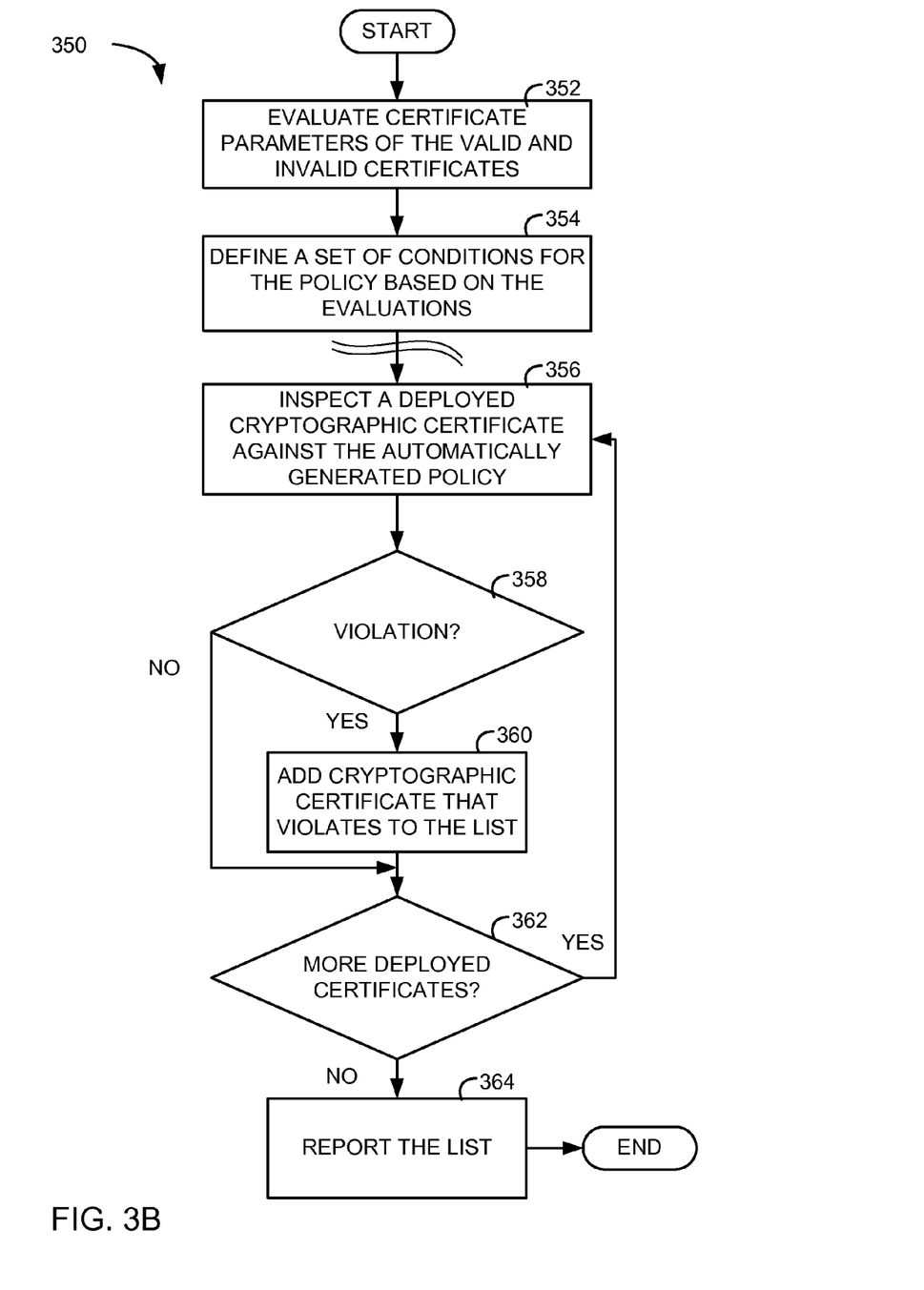
FIG. 3B is a flow diagram of another embodiment of a method of automatically generating a policy from information of a set of one or more cryptographic certificates deployed in a network.

FIG. 3B is a flow diagram of one embodiment of a method 350 of automatically generating a policy from information of a set of one or more cryptographic certificates deployed in a network. The method 350 is performed by processing logic that may comprise hardware (circuitry, dedicated logic, etc.), software (such as is run on a general-purpose computing system or a dedicated machine), or a combination of both. In one embodiment, the computing system 102 of FIG. 1 performs the method 350. In another embodiment, the automated policy generator 120 of FIGS. 1 and 2 performs the method 350. In another embodiment, the CMS 115 of FIG. 1 or CMS 200 of FIG. 2 performs the method 350. Alternatively, other components of the computing system 102, computing system 104, or of both can be configured to perform some or all of the method 350.

Referring to FIG. 3B, processing logic begins method 350 by evaluating certificate parameters of a set of valid and invalid certificates (block 352). As described above, the set of certificates may be designated by input from an administrator or input from another system. The input may include the certificates themselves or may reference information associated with the certificates stored in a data repository. Next, the processing logic defines a set of conditions for a policy based on the evaluations of the certificate parameters (block 354).

In one embodiment, the processing logic inspects a deployed cryptographic certificate against the automatically generated policy (block 356), generated at block 354). In one embodiment, the processing logic inspects the deployed cryptographic certificate in response to the generation of the policy. In another embodiment, the processing logic inspects the deployed cryptographic certificate in response to input, such as an administrator initiating a scan of the currently deployed certificates, or in response to a scheduled task that can initiate a scan of the deployed certificates periodically. As such, there may be some delay between blocks 354 and 356.

Next, processing logic determines if the inspected certificate violates the automatically generated policy (block 358). If so, the processing logic adds the cryptographic certificate that violates the policy to a list (block 360). If at block 358 the certificate does not violate the policy, block 360 is skipped. At block 362, the processing logic determines if there are more deployed certificates to be inspected. If so, the processing logic returns to block 356 to inspect the next deployed certificate. If there are no more deployed certificates at block 362, the processing logic reports the list (block 364), and the method 350 ends.

In another embodiment, the processing logic identifies one or more violations of the automatically generated policy by other cryptographic certificates deployed in the same network as the deployed certificates used to generate the policy. In another embodiment, the processing logic identifies one or more violations of the automatically generated policy by other cryptographic certificates deployed in another network than the network in which the certificates used to generate the policy are located.

In another embodiment, the processing logic applies the automatically generated policy to a set of certificates discovered in the network, and generates a list of violating certificates. In a further embodiment, the processing logic notifies an administrator of the network of the list of violating certificates. In another embodiment, the processing logic initiates a remedial action for the list of violating certificates.

In another embodiment, the processing logic designates a first subset of valid certificates and a second subset of invalid certificates. The processing logic evaluates certificate parameters of the first and second subsets, and defines a set of conditions accordingly. In a further embodiment, the processing logic evaluates the certificate parameters by comparing expiration parameters of the valid certificates and invalid certificates, and defines the set of conditions by defining an expiration condition of the policy based on the expiration parameters of the valid certificates and invalid certificates. In another embodiment, the processing logic evaluates the certificate parameters by comparing key length parameters of the valid certificates and invalid certificates, and defines the set of conditions by defining a key length condition of the policy based on the key length parameters of the valid certificates and invalid certificates. Alternatively, the processing logic can evaluate other certificate parameters of the valid and invalid certificates and define other conditions of the policy based on the evaluations of those certificate parameters.

Figure 4:
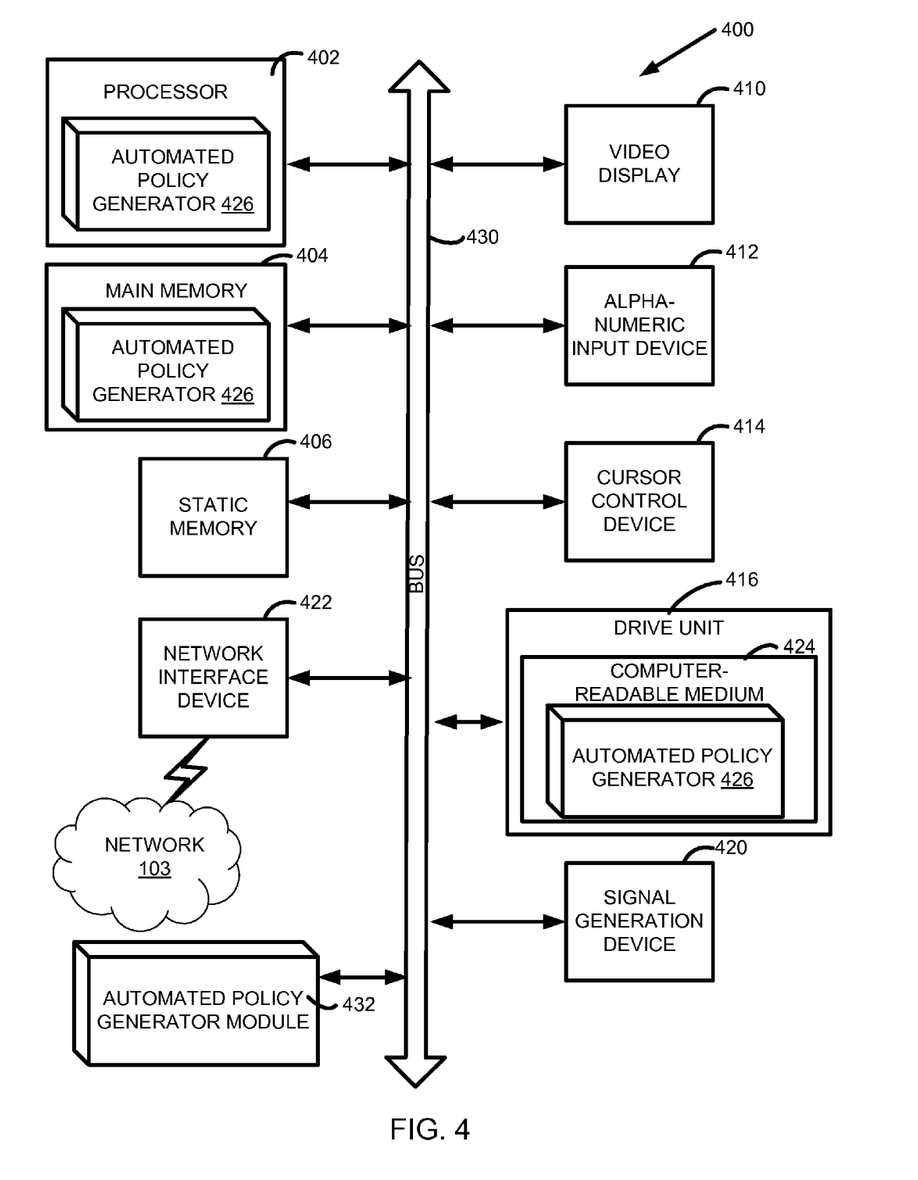
FIG. 4 illustrates a diagrammatic representation of a machine in the exemplary form of a computing system within which a set of instructions, for causing the machine to perform any one or more of the methodologies described herein, may be executed.

FIG. 4 illustrates a diagrammatic representation of a machine in the exemplary form of a computing system 400 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as methods 300 and 350 of FIGS. 3A and 3B.

The exemplary computing system 400 includes a processor 402, a main memory 404 (e.g., read-only memory (ROM), flash memory, dynamic random access memory (DRAM) such as synchronous DRAM (SDRAM), etc.), a static memory 406 (e.g., flash memory, static random access memory (SRAM), etc.), and a data storage device 418, which communicate with each other via a bus 406.

Processor 402 represents one or more general-purpose processing devices such as a microprocessor, central processing unit, or the like. More particularly, the processor 402 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 402 may also be one or more special-purpose processing devices such as an application specific integrated circuit (ASIC), a field programmable gate array (FPGA), a digital signal processor (DSP), network processor, or the like. The processor 402 is configured to execute the processing logic for automated policy generator 426 for performing the operations and steps discussed herein.

The computing system 400 may further include a network interface device 422. The computing system 400 also may include a video display unit 410 (e.g., a liquid crystal display (LCD) or a cathode ray tube (CRT)), an alphanumeric input device 412 (e.g., a keyboard), a cursor control device 414 (e.g., a mouse), and a signal generation device 420 (e.g., a speaker).

The data storage device 416 may include a computer-readable medium 424 on which is stored one or more sets of instructions (e.g., automated policy generator 426) embodying any one or more of the methodologies or functions described herein. The automated policy generator 426 may also reside, completely or at least partially, within the main memory 404 and/or within the processor 402 during execution thereof by the computing system 400, the main memory 404 and the processor 402 constituting computer-readable media. The automated policy generator 426 may further be transmitted or received over a network 420 via the network interface device 422.

While the computer-readable storage medium 424 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing a set of instructions for execution by the machine and that causes the machine to perform any one or more of the methodologies of the present embodiments. The term "computer-readable storage medium" shall accordingly be taken to include, but not be limited to, solid-state memories, optical media, magnetic media, or other types of mediums for storing the instructions. The term "computer-readable transmission medium" shall be taken to include any medium that is capable of transmitting a set of instructions for execution by the machine to cause the machine to perform any one or more of the methodologies of the present embodiments.

The automated policy generator module 432, components, and other features described herein (for example in relation to FIGS. 1-2) can be implemented as discrete hardware components or integrated in the functionality of hardware components such as ASICS, FPGAs, DSPs, or similar devices. The automated policy generator module 432 may implement operations of automated policy generator as described herein with respect to FIGS. 3A-3B. In addition, the automated policy generator module 432 can be implemented as firmware or functional circuitry within hardware devices. Further, the automated policy generator module 432 can be implemented in any combination hardware devices and software components.

The embodiments described herein are directed to the automatic generation of policies from a given set of certificates, such as a set of SSL server certificates. As described herein policies are used to identify violations and initiate remedial processes for deployed server certificates. The embodiments described herein may be used in connection with a CMS, such as the Symantec® CIC or other types of certificate systems. Some conventional CMS may have the ability to manually define policies that should be enforced in the customer's network for SSL server certificates. Policies typically include a set of conditions, and if one or more of those conditions are not met then the policy is considered to be violated. The conditions are typically based on parameters of the SSL server certificate like number of days till expiry, signature algorithm, key length, certificate issuer, etc. The defined policies are applied to each certificate discovered in the customer's environment and a list of violating certificates is created and presented to the user and remedial actions can be manually triggered. However, creating these policies is a manual task and many users may end up with a trial-and-error method of figuring out what parameters to include in the policy and what values to use in the conditions. Even after the trial-and-error based creation of the policy, there still is a chance that some important parameter has been missed. Using the embodiments described herein, instead of asking the user to figure out the policy parameters manually, the automated policy generator asks for a number of certificates in a set from which the policy is automatically generated. The user may specify the set of certificates in two groups—one subset is a set of known "valid certificates" and the other subset contains certificates that are in violation of the generated policy, referred to herein as "invalid certificates." The embodiments described herein can compare all parameters available in all the certificates and come up with conditions. e.g. in the case of key length the condition derived would be based on the minimum key length in the "valid certificates," and certificates that have key lengths less than this value are to be considered in violation of the policy. As another example, the allowed expiry date range can be calculated based on the dates in the "valid certificates" and "invalid certificates." It is also possible to generate policies from a set of valid certificates (everything that does not match the good certificates' parameters is in violation) and invalid certificates (everything that matches the bad certificates' parameters is in violation). All possible certificate parameters may be handled individually or some certificate parameters may be handled with exceptions for those that are expected to be different.

In the above description, well-known structures and devices are shown in block diagram form, rather than in detail, in order to avoid obscuring the present invention. Some portions of the description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "receiving", "storing", "monitoring", "creating", "generating", "sending", "intercepting," "capturing," "mapping", "generating," or the like, refer to the actions and processes of a computing system, or similar electronic computing system that manipulates and transforms data represented as physical (e.g., electronic) quantities within the computing system's registers and memories into other data similarly represented as physical quantities within the computing system's memories or registers or other such information storage, transmission or display devices.

Embodiments of the present invention also relate to an apparatus for performing the operations herein. This apparatus may be specially constructed for the required purposes, or it may comprise a general-purpose computer selectively activated or reconfigured by a computer program stored in the computer. As discussed above, such a computer program may be stored in a computer readable medium.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method, implemented by a computing system programmed to perform the following, comprising:
collecting, by the computing system, information about a set of one or more cryptographic certificates already deployed at one or more remote computing systems over a network, wherein the information about the set of one or more cryptographic certificates comprises certificate parameters from both valid and invalid certificates;

receiving first input to designate a first subset of the set of cryptographic certificates as valid certificates;

receiving second input to designate a second subset of the set of cryptographic certificates as invalid certificates; and automatically generating, by the computing system, a policy from the collected information about the set of one or more cryptographic certificates, wherein automatically generating the policy comprises:

comparing the certificate parameters of the first subset of the set of cryptographic certificates to the certificate parameters of the second subset of the set of cryptographic certificates to generate comparative results; and defining a first condition of a set of conditions for the policy responsive to and based on the comparative results.

2. The method of claim 1, wherein the set of one or more cryptographic certificates comprises at least one of Secure Socket Layer (SSL) server certificates or Transport Layer Security (TLS) server certificates.

3. The method of claim 1, wherein the collected information is stored in a data repository.

4. The method of claim 1, further comprising identifying a violation of the automatically generated policy by other cryptographic certificates deployed in the network.

5. The method of claim 1, further comprising identifying a violation of the automatically generated policy by other cryptographic certificates deployed in another network.

6. The method of claim 1, wherein said automatically generating the policy further comprises defining the set of conditions, which when met by a cryptographic certificate, violates the automatically generated policy, wherein the set of conditions is defined based on the certificate parameters, wherein the set of conditions comprises the first condition.

7. The method of claim 6, wherein the certificate parameters comprise at least one of expiration information, a signature algorithm information, key length information, or certificate issuer information.

8. The method of claim 1, further comprising:
applying the automatically generated policy to a set of certificates discovered in the network; and
generating a list of violating certificates.

9. The method of claim 8, further comprising notifying an administrator of the network of the list of violating certificates.

10. The method of claim 8, further comprising initiating a remedial action for the list of violating certificates.

11. The method of claim 1, wherein said automatically generating the policy further comprises defining the set of conditions.

12. The method of claim 11, wherein said comparing comprises comparing expiration parameters of the valid certificates and invalid certificates, and wherein said defining the set of conditions comprises defining an expiration condition of the policy based on the expiration parameters of the valid certificates and invalid certificates.

13. The method of claim 11, wherein said comparing comprises comparing key length parameters of the valid certificates and invalid certificates, and wherein said defining the set of conditions comprises defining a key length condition of the policy based on the key length parameters of the valid certificates and invalid certificates.

14. A computing system, comprising:
a memory; and
a processor coupled with the memory to execute an automated policy generator, the automated policy generator to:

collect information about a set of one or more cryptographic certificates already deployed at one or more remote computing systems over a network, wherein the information about the set of one or more cryptographic certificates comprises certificate parameters from both valid and invalid certificates;

receive first input to designate a first subset of the set of cryptographic certificates as valid certificates;

receive second input to designate a second subset of the set of cryptographic certificates as invalid certificates; and automatically generate a policy from the collected information about the set of one or more cryptographic certificates, wherein automatically generating the policy comprises:

comparing the certificate parameters of the first subset of the set of cryptographic certificates to the certificate parameters of the second subset of the set of cryptographic certificates to generate comparative results; and defining a first condition of a set of conditions for the policy based on the comparative results.

15. The computing system of claim 14, wherein the automated policy generator is further to define the set of conditions, which when met by a cryptographic certificate, violates the automatically generated policy, and wherein the set of conditions is defined based on the certificate parameters, wherein the set of conditions comprises the first condition.

16. A non-transitory computer readable storage medium including instructions that, when executed by a processor, cause the processor to:

collect information about a set of one or more cryptographic certificates already deployed at one or more remote computing systems over a network, wherein the information about the set of one or more cryptographic certificates comprises certificate parameters from both valid and invalid certificates;

receive first input to designate a first subset of the set of cryptographic certificates as valid certificates;

receive second input to designate a second subset of the set of cryptographic certificates as invalid certificates; and automatically generate a policy from the collected information about the set of one or more cryptographic certificates, wherein automatically generating the policy comprises:

comparing the certificate parameters of the first subset of the set of cryptographic certificates to the certificate parameters of the second subset of the set of cryptographic certificates to generate comparative results; and defining a first condition of a set of conditions for the policy based on the comparative results.

17. The non-transitory computer readable storage medium of claim 16, wherein to automatically generate the policy further comprises to define the set of conditions.

18. The non-transitory computer readable storage medium of claim 17, wherein said comparing comprises comparing expiration parameters of the valid certificates and invalid certificates, and wherein said defining the set of conditions comprises defining an expiration condition of the policy based on the expiration parameters of the valid certificates and invalid certificates.

19. The non-transitory computer readable storage medium of claim 17, wherein said comparing comprises comparing key length parameters of the valid certificates and invalid certificates, and wherein said defining the set of conditions comprises defining a key length condition of the policy based on the key length parameters of the valid certificates and invalid certificates.

* * * * *